United States Patent [19]
Chung

[11] Patent Number: 6,003,138
[45] Date of Patent: Dec. 14, 1999

[54] COMPUTER PERIPHERAL POWER DISTRIBUTION DEVICE

[75] Inventor: Ho-Min Chung, Taipei, Taiwan

[73] Assignee: Silitek Corporation, Taipei, Taiwan

[21] Appl. No.: 09/006,153

[22] Filed: Jan. 13, 1998

[51] Int. Cl.⁶ ....................................... G06F 1/32
[52] U.S. Cl. .............................. 713/300; 710/36; 710/62; 710/64; 710/72
[58] Field of Search ................................. 710/36, 62, 72, 710/64; 713/300

[56] References Cited

U.S. PATENT DOCUMENTS

| | | | |
|---|---|---|---|
| 5,675,813 | 10/1997 | Holmdahl | 713/310 |
| 5,884,086 | 3/1999 | Amoni et al. | 713/300 |

*Primary Examiner*—Glenn A. Auve
*Assistant Examiner*—Rupal D. Dharia
*Attorney, Agent, or Firm*—Smith, Gambrell & Russell, LLP Beveridge, DeGrandi, Weilacher & Young

[57] ABSTRACT

The subject matter relates to a computer peripheral power distribution device, comprising a PC, a keyboard and a scanner, wherein one of the USB ports of the PC is connected by a USB wire to the USB control and microprocessor of the scanner; the keyboard is connected by a transmission cable respectively to the PC and the motor control and step motor of the scanner, thus by such connection, the working power for said scanner may come from the power transmitted from the PC through the USB port and the keyboard, so that it will not only eliminate the installation of a DC converter within the scanner, but will also reduce its total weight, and achieve the purposes of reduced power consumption, convenient portability and reduced costs.

1 Claim, 2 Drawing Sheets

COMPUTER PERIPHERAL POWER DISTRIBUTION DEVICE

BACKGROUND OF THE INVENTION

The subject matter relates to a computer peripheral power distribution device, particularly to one in which the working power for the scanner may come from the power transmitted from the PC through a USB port and the keyboard.

Conventionally, in a regular peripheral device (such as a keyboard, a scanner, etc.) that is connected with a PC, the working voltage of the keyboard comes from the power transmitted from the PC; while the working power and current (12 V–1.6 A) for the scanner are obtained from a DC converter that is installed inside the scanner.

However, such a DC converter is bulky, heavy, and consumes a large amount of current, therefore, its design of integral power distribution is less than satisfactory.

Therefore, the subject inventor has devoted research, with technical applications, and has presented a device that will achieve the purpose of integral power distribution without the need of the DC converter.

SUMMARY OF THE INVENTION

The primary objective of the subject matter is to present a computer peripheral power distribution device, wherein a USB port of a PC is connected through a Universal Serial Bus (USB) wire to the USB control and microprocessor of the scanner; the keyboard is connected through a transmission cable respectively to the PC and the motor control and step motor of the scanner, so the working power of said scanner can come from the power transmitted from the PC through the USB port and the keyboard, thus it will not only do without the installation of a DC converter inside the scanner, but will reduce its total weight, and achieve the purposes of reduced power consumption, convenient portability and reduced costs.

To enable better understanding of the objectives, configuration, construction or device characteristics and performance of the subject matter, please refer to the following detailed description with drawings;

| Brief Description of Numerals |
| --- |
| 1 PC |
| 11 universal serial bus cable |
| 2 keyboard |
| 21 transmission cable |
| 3 scanner |
| 31 USB control |
| 32 microprocessor |
| 33 switch |
| 34 ASIC chip |
| 35 CIS current detecting power |
| 36 CIS light source circuit |
| 37 analog circuit |
| 38 motor control |
| 39 step motor |

DETAILED DESCRIPTION OF PREFERRED EMBODIMENT

Figure 1:
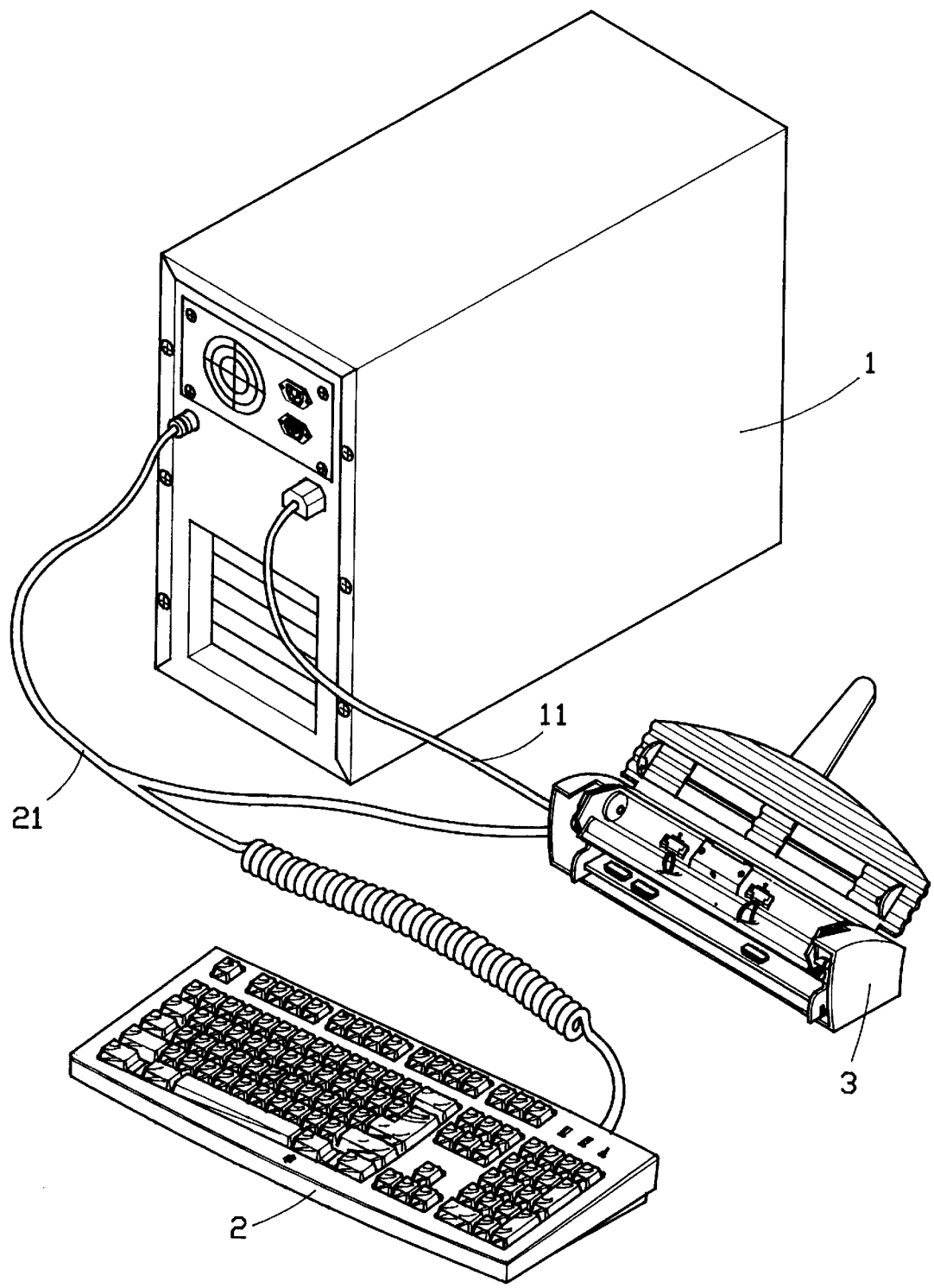
FIG. 1 is a perspective view of the subject matter.
Figure 2:
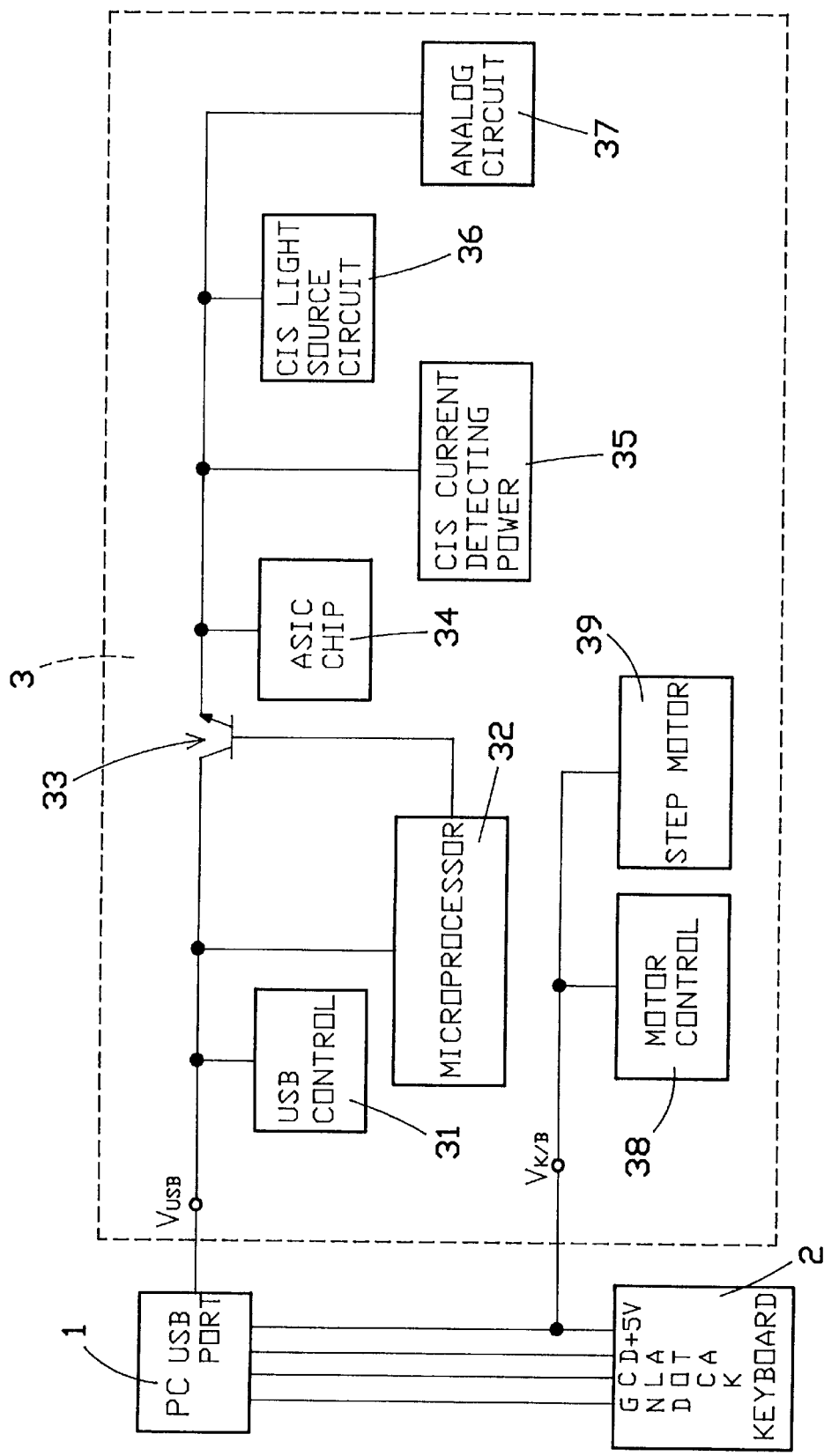
FIG. 2 is a wiring block diagram of the subject matter of scanner and an illustration of the connection between the PC port and the keyboard.

Referring to FIGS. 1 and 2, the subject matter relates to a "computer peripheral power source distribution device", comprising a PC 1, a keyboard 2 and a scanner 3; wherein: The scanner 3 has a circuit assembly that comprises a USB control 31, a microprocessor 32, a switch 33, an ASIC chip 34, a CIS current detecting circuit, a CIS light source circuit, an analog circuit 37, a motor control 38 and a step motor 39, wherein the basic terminal of the switch 33 is connected to the control terminal of the microprocessor 32; the transmission terminal of the switch 33 is connected to the ASIC chip 34, CIS current detecting circuit 35, a CIS light source circuit 36 and an analog circuit 37; the collecting terminal of the switch is connected to the USB control 31 and the microprocessor 32.

The PC 1 has a set of USB ports, one of the USB ports is connected by a USB wire 11 to the control 31 of said scanner 3 and a microprocessor 32, to supply the power (+5V) and the working current (lower than 500 mA).

The keyboard 2 is connected by a transmission cable (on which are a VCC power cord, a GND grounding, a DATA wire and a CLOCK signal wire) 21 respectively to the PC 1 and the motor control 38 and a step motor 39 of the scanner 3, to supply the power (+5V) and the working current (lower than 500 mA).

By such a special design, the working power and current of the scanner 3 can be supplied from the power delivered from the PC 1 through the USB port and the keyboard 2, so not only the installation of the DC converter inside the scanner is unnecessary, but it will reduce the weight, thus achieving the purposes of reduced energy consumption, convenient portability and reduced costs.

Besides, in the subject matter, the motor control 38 and the step motor 39 of the scanner 3 can also be connected directly to another USB port on the PC 1, so that the working power for said motor control 38 and the step motor 39 comes from said USB port.

Summing up, the subject matter of "computer peripheral power distribution device", featuring the elimination of the DC converter by transmitting the working power and current for the scanner from the PC through the USB port and the keyboard, thus achieving the purposes of reduced total weight, convenient portability and reduced costs.

It is hereby declared that the above description, covering only the preferred embodiment of the subject matter, should not be based to limit or restrict the subject claim, and that all equivalent structural and/or configurational variations and/or modifications easily conceivable to anyone skilled in the subject art, and deriving from the subject description with drawings herein shall reasonably be included in the intent of the subject claim.

I claim:

1. A computer peripheral power distribution device, comprising a PC, a keyboard and a scanner, the PC having one or more universal serial bus (USB) ports, one of the USB ports being connected through a USB wire to the USB control and the microprocessor of the scanner; the keyboard being connected by a transmission cable respectively to the PC and the motor control and step motor of the scanner, so the working power for said scanner may come from the power supply transmitted from the PC through the USB port and the keyboard.

* * * * *